US010429805B2

United States Patent
Yagi (10) Patent No.: US 10,429,805 B2
(45) Date of Patent: Oct. 1, 2019

(54) CONTROL SYSTEM AND RECEPTION DEVICE

(71) Applicant: NIKON CORPORATION, Tokyo (JP)

(72) Inventor: Takeshi Yagi, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 308 days.

(21) Appl. No.: 14/826,550

(22) Filed: Aug. 14, 2015

(65) Prior Publication Data

US 2015/0355614 A1  Dec. 10, 2015

Related U.S. Application Data (63) Continuation of application No. PCT/JP2014/054007, filed on Feb. 20, 2014.

(30) Foreign Application Priority Data

Feb. 27, 2013 (JP) ................................ 2013-036930

(51) Int. Cl.
*G05B 15/02* (2006.01)
*G06Q 50/26* (2012.01)
(Continued)

(52) U.S. Cl.
CPC ............... *G05B 15/02* (2013.01); *F24C 7/08* (2013.01); *G01S 11/06* (2013.01); *G06Q 50/265* (2013.01);
(Continued)

(58) Field of Classification Search
None
See application file for complete search history.

(56) References Cited

U.S. PATENT DOCUMENTS 5,510,771 A * 4/1996 Marshall ............ G08B 21/0202
340/539.1
5,521,652 A * 5/1996 Shalvi ................... G06F 1/1601
348/162
(Continued)

FOREIGN PATENT DOCUMENTS

JP 2010-109410 5/2010
JP 2012-117707 6/2012

OTHER PUBLICATIONS

International Search Report dated Apr. 8, 2014 in corresponding International Patent Application No. PCT/JP2014/054007.
(Continued)

*Primary Examiner* — Thomas C Lee
*Assistant Examiner* — Gary Collins (57) ABSTRACT

A control system includes: a first transmitter; a second transmitter; and a reception device. The first transmitter includes a transmission unit configured to transmit radio waves to the reception device, the second transmitter includes a transmission unit configured to transmit radio waves to the reception device; and the reception device includes: a reception unit configured to receive radio waves transmitted from the first transmitter and the second transmitter; an identification unit configured to identify whether a transmission source of the radio waves is the first transmitter or is the second transmitter based on the radio waves received by the reception unit; a measurement unit configured to measure the distance between the device and the transmission source of the radio waves identified by the identification unit; and a control unit configured to perform a first control that sets a limitation on the device or a second control that does not set a limitation on the device based on the distance, measured by the measurement unit, between the device and the transmission source of the radio waves.

7 Claims, 6 Drawing Sheets

(51) Int. Cl.
*H04W 4/70* (2018.01)
*F24C 7/08* (2006.01)
*G08C 17/02* (2006.01)
*G01S 11/06* (2006.01)

(52) U.S. Cl.
CPC .............. *G08C 17/02* (2013.01); *H04W 4/70* (2018.02); *G08C 2201/91* (2013.01)

(56) References Cited

U.S. PATENT DOCUMENTS

| | | | | |
|---|---|---|---|---|
| 5,525,967 | A * | 6/1996 | Azizi | G01S 13/74 340/539.1 |
| 5,661,460 | A * | 8/1997 | Sallen | G01S 13/84 340/539.1 |
| 6,302,438 | B1 * | 10/2001 | Stopper, Jr. | B60R 21/0154 280/735 |
| 2002/0186135 | A1 * | 12/2002 | Wagner | F16C 19/36 340/572.8 |
| 2005/0253707 | A1 * | 11/2005 | Clarke | G01S 3/54 340/539.15 |
| 2006/0176178 | A1 * | 8/2006 | Everest | A01K 15/023 340/572.1 |
| 2006/0197704 | A1 * | 9/2006 | Luzzatto | G01S 11/06 342/458 |
| 2008/0077255 | A1 * | 3/2008 | Gila | G05B 19/042 700/13 |
| 2009/0089565 | A1 * | 4/2009 | Buchanan | G06F 15/16 713/1 |
| 2010/0064532 | A1 * | 3/2010 | Wittke | B27G 19/003 30/382 |
| 2010/0107185 | A1 * | 4/2010 | Shintani | H04N 21/4126 725/25 |
| 2010/0289662 | A1 * | 11/2010 | Dasilva | F16P 3/147 340/686.6 |
| 2013/0158862 | A1 * | 6/2013 | Stahlin | H04W 4/22 701/410 |

OTHER PUBLICATIONS

PCT Written Opinion of the International Searching Authority dated Apr. 8, 2014 in corresponding International Patent Application No. PCT/JP2014/054007.
Japanese Office Action dated Sep. 5, 2017 in corresponding Japanese Patent Application No. 2015-502890.
Office Action dated Dec. 19, 2017 in corresponding Japanese Patent Application No. 2015-502890, 4 pgs.

* cited by examiner

CONTROL SYSTEM AND RECEPTION DEVICE

CROSS-REFERENCE TO RELATED APPLICATION

This is a Continuation Application of International Application No. PCT/JP2014/054007 filed on Feb. 20, 2014, which claims priority on Japanese Patent Application No. 2013-36930 filed on Feb. 27, 2013. The contents of the aforementioned applications are incorporated herein by reference.

BACKGROUND

Field of the Invention

The present invention relates to a control system of an apparatus and a reception device.

Background

In the related art, child safety sensors that control apparatuses such as heating apparatuses and fan heaters to improve the safety for a child have been proposed (for example, refer to Japanese Patent Application, Publication No. 2012-117707). A child safety sensor disclosed in Japanese Patent Application, Publication No. 2012-117707 detects an approaching person by using a human detection sensor. Then, when a person is detected, the child safety sensor stops the operation of the apparatus (heating apparatus, fan heater) provided with the device (child safety sensor) or notifies neighboring people of the approach of a child by alarm notification. As a result, it is possible to improve the safety for a child.

SUMMARY

However, in the related art, the electronic apparatus such as a heating apparatus or a fan heater is controlled based on the approach of the child safety sensor. Therefore, for example, even when an adult is present close to a child and is watching the behavior of the child, there are cases in which the operation of the electronic apparatus may unnecessarily stop due to the approach of the child safety sensor.

An object of an aspect of the present invention is to provide a control system of an apparatus and a reception device having improved safety and convenience.

An aspect of the present invention is a control system including: a first transmitter; a second transmitter; and a reception device configured to control the device based on radio waves transmitted from the first transmitter and the second transmitter, wherein the first transmitter includes a transmission unit configured to transmit radio waves to the reception device, the second transmitter includes a transmission unit configured to transmit radio waves to the reception device; and the reception device includes: a reception unit configured to receive radio waves transmitted from the first transmitter and the second transmitter; an identification unit configured to identify whether a transmission source of the radio waves is the first transmitter or is the second transmitter based on the radio waves received by the reception unit; a measurement unit configured to measure the distance between the device and the transmission source of the radio waves identified by the identification unit; and a control unit configured to perform a first control that sets a limitation on the device or a second control that does not set a limitation on the device based on the distance, measured by the measurement unit, between the device and the transmission source of the radio waves.

An aspect of the present invention is a reception device including: a reception unit configured to receive radio waves transmitted from a first transmitter and a second transmitter; an identification unit configured to identify whether a transmission source of the radio waves is the first transmitter or is the second transmitter based on the radio waves received by the reception unit; a measurement unit configured to measure the distance between the device and the transmission source of the radio waves identified by the identification unit; and a control unit configured to perform a first control that sets a limitation on the device or a second control that does not set a limitation on the device based on the distance, measured by the measurement unit, between the device and the transmission source of the radio waves.

According to an aspect of the present invention, it is possible to provide a control system of an apparatus and a reception device having safety and improved convenience.

DESCRIPTION OF THE EMBODIMENTS

Hereinafter, embodiments of the present invention will be described with reference to the drawings.

First Embodiment

Figure 1:
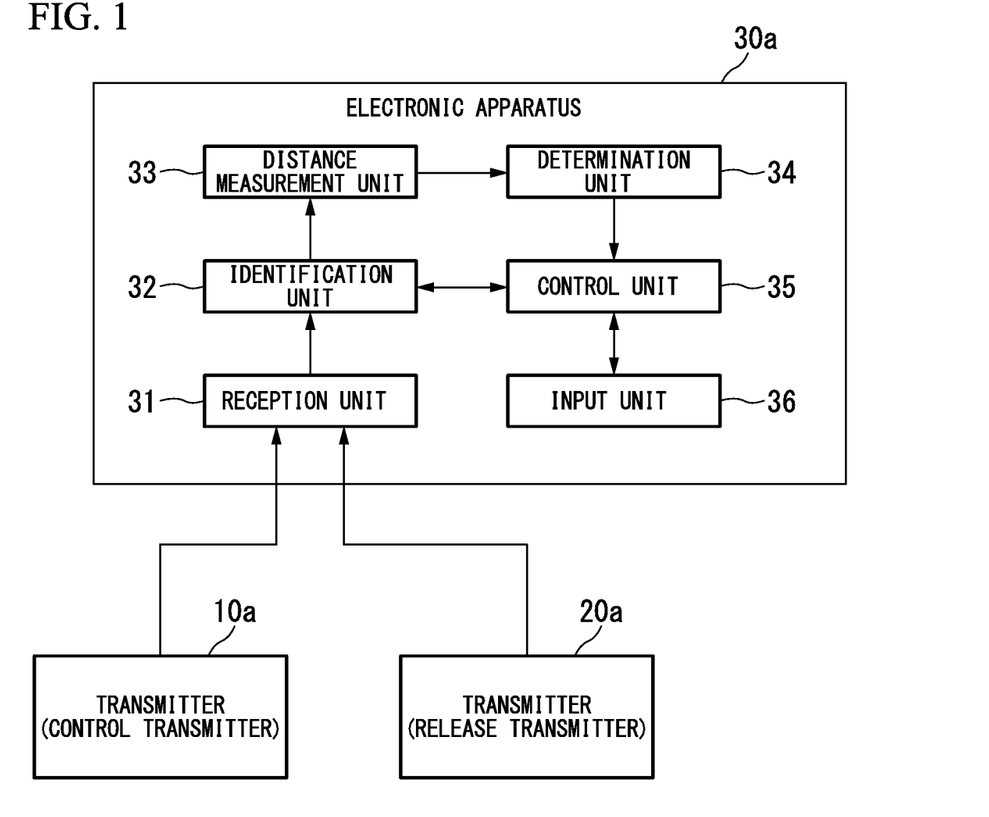
FIG. 1 is a block diagram showing a system configuration in a first embodiment of a control system.

FIG. 1 is a block diagram showing a system configuration in a first embodiment of a control system.

The control system of the first embodiment includes a transmitter 10a, a transmitter 20a, and an electronic apparatus 30a (reception device, device, or apparatus). In the following description, the transmitter 10a is referred to as a control transmitter 10a, and the transmitter 20a is referred to as a release transmitter 20a.

The control transmitter (first transmitter) 10a transmits a radio signal including identification information to the electronic apparatus 30a via radio waves.

The release transmitter (second transmitter) 20a transmits a radio signal including identification information to the electronic apparatus 30a via radio waves.

The control transmitter 10a and the release transmitter 20a may transmit radio waves at a constant time interval or may keep transmitting radio waves constantly.

The electronic apparatus 30a controls the apparatus (electronic apparatus 30a, body) based on radio waves transmitted from the control transmitter 10a and radio waves transmitted from the release transmitter 20a. The electronic apparatus represents an apparatus that includes a circuitry. Examples of the electronic apparatus include a home electrical appliance, a heating appliance such as a stove, and the like.

Wireless communications between the control transmitter 10a and the electronic apparatus 30a and between the release transmitter 20a and the electronic apparatus 30a may be performed, for example, by a method such as Wi-Fi (registered trademark) or Bluetooth (registered trademark).

Hereinafter, a specific configuration of the electronic apparatus 30a will be described. The electronic apparatus 30a includes a CPU (Central Processing Unit), a memory, an auxiliary storage device, and the like connected to one another via a bus, and executes a control program. By executing the control program, the electronic apparatus 30a functions as a device including a reception unit 31, an identification unit 32, a distance measurement unit 33, a determination unit 34, a control unit 35, and an input unit 36. All or part of the functions of the electronic apparatus 30a may be realized by using hardware such as an ASIC (Application Specific Integrated Circuit), a PLD (Programmable Logic Device), and a FPGA (Field Programmable Gate Array). Further, the control program may be recorded on a computer-readable recording medium. Examples of the "computer-readable recording medium" include portable media such as a flexible disk, a magneto-optical disc, a ROM, and a CD-ROM, and a storage device such as a hard disk incorporated in a computer system. Further, the control program may be transmitted or received via a telecommunication line.

The reception unit 31 receives radio waves transmitted from the control transmitter 10a and radio waves transmitted from the release transmitter 20a.

The identification unit 32 identifies the transmission source of the radio waves based on the radio waves received by the reception unit 31. Specifically, the identification unit 32 identifies whether the transmission source of the radio waves is the control transmitter 10a or is the release transmitter 20a based on identification information included in the radio waves received by the reception unit 31.

The identification unit 32 outputs an identification result including an identified result to the distance measurement unit 33 and the control unit 35.

The distance measurement unit 33 measures the distance from the apparatus (electronic apparatus 30a) to the transmission source of the radio waves. Further, the distance measurement unit 33 stores a plurality of estimation distances in advance, one of the estimated distances corresponding to each of intensities of received radio waves (radio waves intensities). The distance measurement unit 33 measures the intensity of the radio waves received by the reception unit 31, and an estimated distance corresponding to the value of the measured radio waves intensity is regarded as the distance from the apparatus to the transmission source of the radio waves. The radio waves intensity is the strength of the radio waves received by the electronic apparatus 30a.

The determination unit 34 determines whether or not the distance measured by the distance measurement unit 33 is within a predetermined distance. When the distance measured by the distance measurement unit 33 is within a predetermined distance, the determination unit 34 notifies the control unit 35 to perform a control on the apparatus. On the other hand, when the distance measured by the distance measurement unit 33 is equal to or more than the predetermined distance, the determination unit 34 does not perform the process. The predetermined distance may be, for example, a distance stored by the determination unit 34 at the time of shipment, or may be arbitrarily determined by the user (for example, adult).

The control unit 35 controls the function units. Further, the control unit 35 performs the control based on the result determined by the determination unit 34 and the identification result output from the identification unit 32. For example, when the distance measured by the distance measurement unit 33 is within the predetermined distance, and the transmission source of the radio waves identified by the identification unit 32 is the control transmitter 10a, the control unit 35 sets a limitation on the apparatus (first control). Specifically, the control unit 35 controls the operation of the apparatus to the degree that the apparatus does not harm a child.

Hereinafter, two specific examples of the operation control to the degree that the apparatus does not harm a child will be described. As a first specific example, the control operation of an electric fan is described. In case of an operation of rotating a fan by a motor to generate a wind like an electric fan, the control unit 35 performs the control such that the rotation speed of the fan is reduced. By controlling in this way, it is possible to prevent physical damage to a child that may occur when the child comes into contact with the fan of the electric fan or the like from occurring.

Further, as a second specific example, the control operation of a heating appliance is described. The heating appliance is an electronic apparatus that generates heat. Examples of the heating appliances include a heating apparatus and a stove. In a case of an operation of generating heat like a heating appliance, the control unit 35 controls a temperature. Specifically, the control unit 35 decreases the temperature of the heating appliance based on the distance to the control transmitter 10a. Alternatively, the control unit 35 may stop the operation of the heating appliance. By controlling the heating appliance in this way, it is possible to prevent a burn of a child or the like that may occur when the child comes into contact with the heating appliance or the like from occurring.

Further, the control unit 35 may control the operation of the input unit 36 such that an input from the input unit 36 is not accepted, or may turn off the power of the apparatus to stop the operation. Further, when the reception unit 31 does not receive radio waves from the control transmitter 10a for a given period of time (for example, 5 seconds, 10 seconds, or the like), the control unit 35 may release the limitation on the apparatus. Further, when the distance measured by the distance measurement unit 33 is equal to or greater than the predetermined distance, the control unit 35 may release the limitation on the apparatus.

Further, when the distance measured by the distance measurement unit 33 is within the predetermined distance, and the transmission source of the radio waves identified by the identification unit 32 is the release transmitter 20a, the control unit 35 releases the limitation on the apparatus (second control). Specifically, the control unit 35 sets the apparatus back to a state before the limitation is set on the apparatus and thereby releases the limitation on the apparatus. The control unit 35 does not set a limitation on the apparatus even when the radio waves transmitted from the control transmitter 10a are within the predetermined distance while the radio waves transmitted from the release transmitter 20a are present within the predetermined distance.

The input unit 36 is configured by using an existing input device such as a keyboard, a pointing device (mouse, tablet, or the like), a button, and a touch panel. The input unit 36 is operated by a user when an instruction of the user is input to the electronic apparatus 30a. The input unit 36 may be an interface for connecting the input device to the electronic apparatus 30a. In this case, the input unit 36 allows an input signal generated in response to an input of the user in the input device to be input to the electronic apparatus 30a. The input unit 36 accepts an input from the outside (for example, adult, child). For example, the input unit 36 is a power button, a setting button used for setting the apparatus, or the like.

Figure 2:
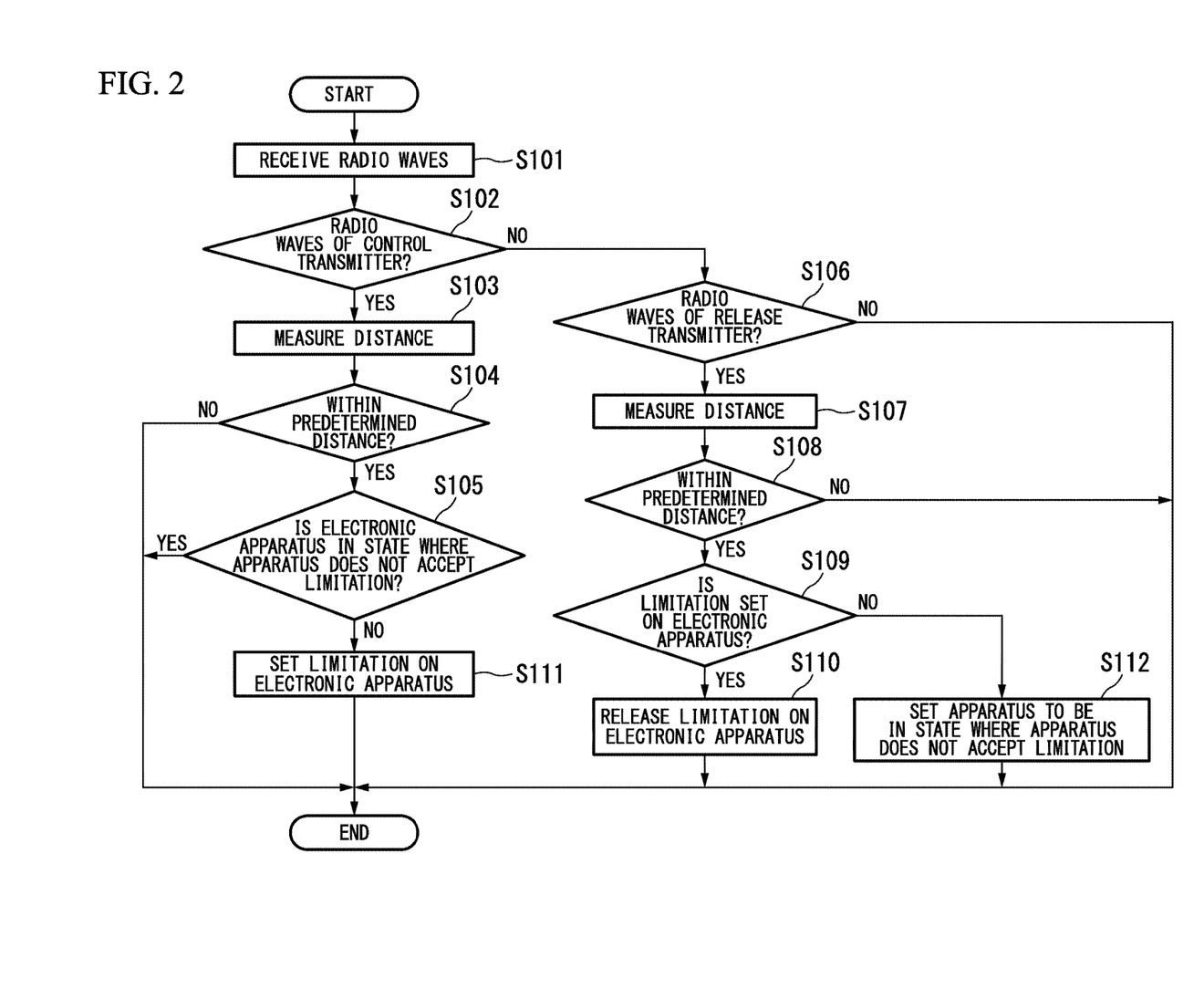
FIG. 2 is a flowchart showing a specific example of a flow of a control process of an electronic apparatus in the first embodiment.

FIG. 2 is a flowchart showing a specific example of a flow of a control process of the electronic apparatus 30a in the first embodiment.

The reception unit 31 of the electronic apparatus 30a receives radio waves transmitted from the control transmitter 10a or the release transmitter 20a (step S101). The identification unit 32 identifies whether or not the received radio waves are the radio waves of the control transmitter 10a (step S102). Specifically, the identification unit 32 refers to identification information included in the received radio waves and identifies whether or not the received radio waves are the radio waves of the control transmitter 10a.

When the identification unit 32 determines that the received radio waves are the radio waves of the control transmitter 10a (step S102—YES), the distance measurement unit 33 measures the distance from the apparatus (electronic apparatus 30a) to the control transmitter 10a that is the transmission source of the radio waves (hereinafter, referred to as "the apparatus—control transmitter 10a distance" (step S103). Specifically, first, the distance measurement unit 33 measures the intensity of the received radio waves (radio waves intensity) of the control transmitter 10a. Then, the distance measurement unit 33 regards an estimated distance corresponding to the value of the measured radio waves intensity as the distance from the apparatus to the transmission source of the radio waves.

The determination unit 34 determines whether or not the apparatus—control transmitter 10a distance measured by the distance measurement unit 33 is within a predetermined distance (step S104). When the determination unit 34 determines that the apparatus—control transmitter 10a distance is within the predetermined distance (step S104—YES), the determination unit 34 determines whether or not the apparatus is in a state where the apparatus does not accept a limitation (step S105). Specifically, the state where the apparatus does not accept a limitation is a state where the release transmitter 20a is present within a predetermined distance of the electronic apparatus 30a. When the apparatus is in a state in which the apparatus does not accept a limitation (step S105—YES), the control unit 35 does not limit the operation of the apparatus. Then, the process of FIG. 2 is terminated.

In the process of step S102, when the identification unit 32 determines that the received radio waves are not the radio waves of the control transmitter 10a (step S102—NO), the identification unit 32 identifies whether or not the received radio waves are the radio waves of the release transmitter 20a (step S106). When the identification unit 32 determines that the received radio waves are the radio waves of the release transmitter 20a (step S106—YES), the distance measurement unit 33 measures the distance from the apparatus to the release transmitter 20a that is the transmission source of the radio waves (hereinafter, referred to as "the apparatus—release transmitter 20a distance" (step S107). The determination unit 34 determines whether or not the apparatus—release transmitter 20a distance measured by the distance measurement unit 33 is within a predetermined distance (step S108). When the determination unit 34 determines that the apparatus—release transmitter 20a distance is within the predetermined distance (step S108—YES), the determination unit 34 determines whether or not a limitation is set on the apparatus (step S109).

When the determination unit 34 determines that a limitation is set on the apparatus (step S109—YES), the control unit 35 releases the limitation on the apparatus (step S110). Specifically, the control unit 35 sets the apparatus back to a state before the limitation is set on the apparatus (for example, an initial state) and thereby releases the limitation. Then, the process of FIG. 2 is terminated.

In the process of step S104, when the determination unit 34 determines that the apparatus—control transmitter 10a distance is not within the predetermined distance (step S104—NO), the electronic apparatus 30a terminates the process.

In the process of step S105, when the apparatus is not in a state in which the apparatus does not accept a limitation (step S105—NO), the control unit 35 sets a limitation on the apparatus (step S111). Specifically, the control unit 35 controls the operation of the apparatus to the degree that the apparatus does not harm a child. Then, the process of FIG. 2 is terminated.

In the process of step S106, when the identification unit 32 determines that the received radio waves are not the radio waves of the release transmitter 20a (step S106—NO), the electronic apparatus 30a terminates the process. Radio waves other than those from the control transmitter 10a and the release transmitter 20a are, for example, operation signals to the input unit 36 by a remote control or the like.

In the process of step S108, when the determination unit 34 determines that the apparatus—release transmitter 20a distance is not within the predetermined distance (step S108—NO), the electronic apparatus 30a terminates the process.

In the process of step S109, when the determination unit 34 determines that a limitation is not set on the apparatus (step S109—NO), the control unit 35 sets the apparatus to be in a state where the apparatus does not accept a limitation (step S112). Specifically, in the process of step S112 and the subsequent processes, while the release transmitter 20a is present within a predetermined distance, even when the control transmitter 10a is present within a predetermined distance, the control unit 35 does not limit the operation of the apparatus. Then, the electronic apparatus 30a terminates the process.

Figure 3:
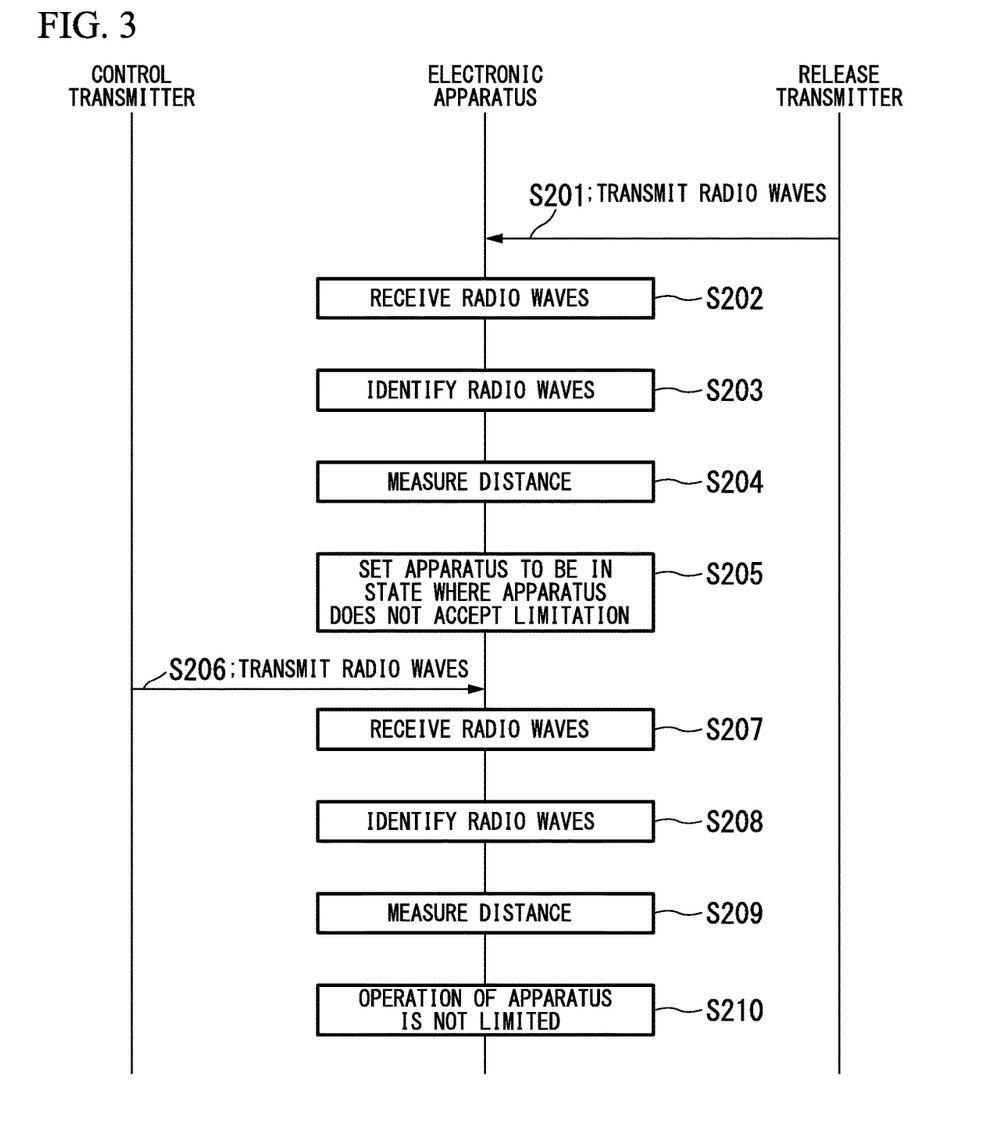
FIG. 3 is a sequence diagram showing a specific operation of the control process in the first embodiment.

FIG. 3 is a sequence diagram showing a specific operation of the control process in the first embodiment.

The release transmitter 20a transmits a radio signal including identification information of the release transmitter 20a via radio waves (step S201). The reception unit 31 of the electronic apparatus 30a receives radio waves transmitted from the release transmitter 20a (step S202). The identification unit 32 identifies the transmission source of the radio waves based on the identification information included in the received radio waves (step S203). Then, the identification unit 32 outputs the identified result to the distance measurement unit 33 and the control unit 35. The distance measurement unit 33 measures the apparatus—release transmitter 20a distance (step S204). Then, the control unit 35 sets the apparatus to be in a state where the apparatus does not accept a limitation based on the measured apparatus—release transmitter 20a distance (step S205). Specifically, while the release transmitter 20a is present within a predetermined distance, in the subsequent processes, even when the control transmitter 10a is present within a predetermined distance, the control unit 35 does not limit the operation of the apparatus. The control transmitter 10a transmits a radio signal including identification information of the control transmitter 10a via radio waves (step S206). The reception unit 31 of the electronic apparatus 30a receives radio waves transmitted from the control transmitter 10a (step S207). The identification unit 32 identifies the transmission source of the radio waves based on the identification information included in the received radio waves (step S208). Then, the identified result is output to the distance measurement unit 33 and the control unit 35. The distance measurement unit 33 measures the apparatus—control transmitter 10a distance (step S209). Then, even when the measured apparatus—control transmitter 10a distance is within a predetermined distance, the control unit 35 does not limit the operation of the apparatus (step S210). Then, the process of FIG. 3 is terminated.

While the apparatus is in a state where the apparatus does not accept a limitation, the process of step S209 may not be performed. Specifically, while the apparatus is in a state where the apparatus does not accept a limitation, the control unit 35 may be configured such that the control unit 35 does not limit the operation of the apparatus regardless of the apparatus—control transmitter 10a distance.

Figure 4:
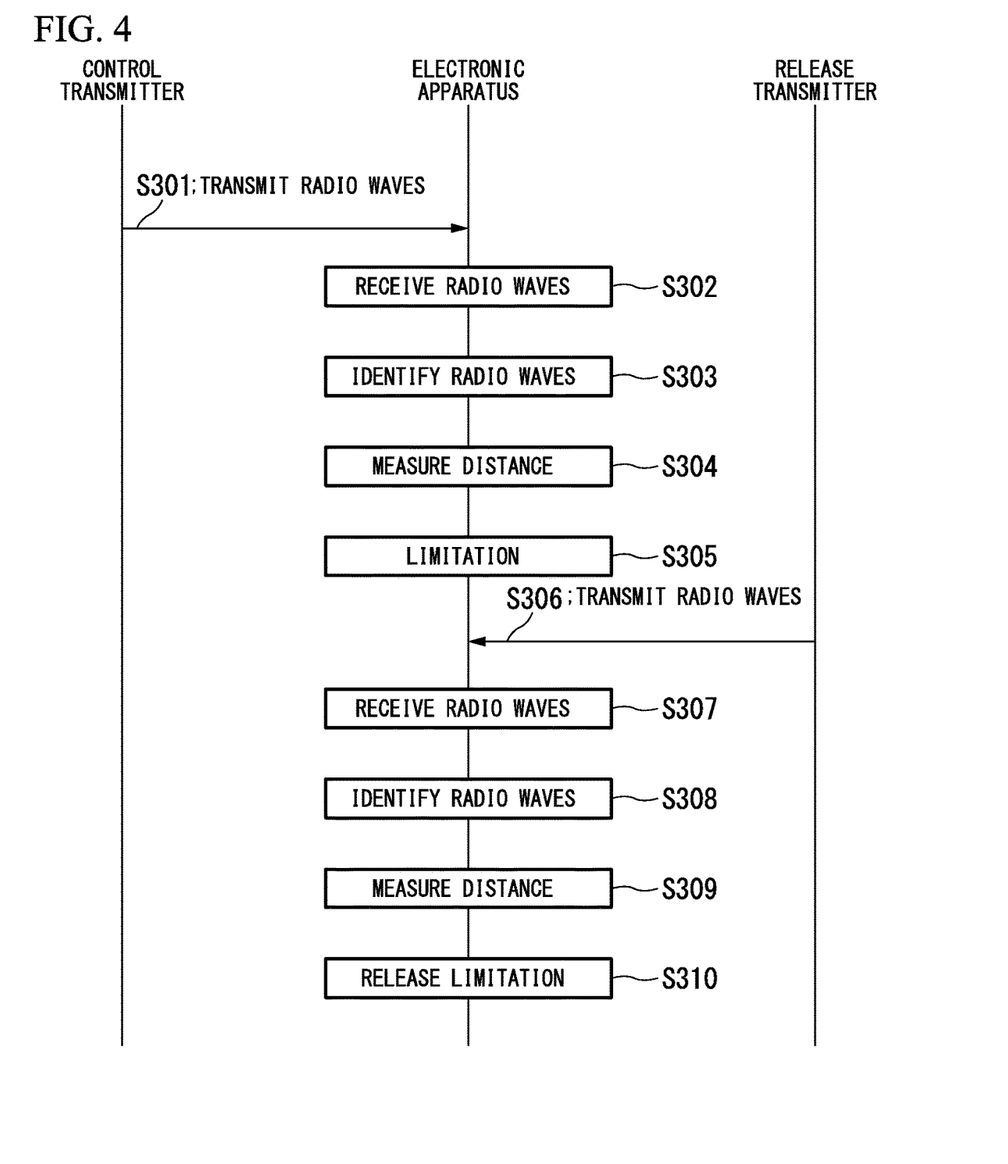
FIG. 4 is a sequence diagram showing a specific operation of a release process of a control in the first embodiment.

FIG. 4 is a sequence diagram showing a specific operation of a release process of a control in the first embodiment.

The control transmitter 10a transmits a radio signal including identification information of the control transmitter 10a via radio waves (step S301). The reception unit 31 of the electronic apparatus 30a receives radio waves transmitted from the control transmitter 10a (step S302). The identification unit 32 identifies the transmission source of the radio waves based on the identification information included in the received radio waves (step S303). Then, the identification unit 32 outputs the identified result to the distance measurement unit 33 and the control unit 35. The distance measurement unit 33 measures the apparatus—control transmitter 10a distance (step S304). Then, the control unit 35 sets a limitation on the apparatus based on the measured apparatus—control transmitter 10a distance (step S305).

The release transmitter 20a transmits a radio signal including identification information of the release transmitter 20a via radio waves (step S306). The reception unit 31 of the electronic apparatus 30a receives radio waves transmitted from the release transmitter 20a (step S307). The identification unit 32 identifies the transmission source of the radio waves based on the identification information included in the received radio waves (step S308). Then, the identified result is output to the distance measurement unit 33 and the control unit 35. The distance measurement unit 33 measures the apparatus—release transmitter 20a distance (step S309). Then, the control unit 35 releases the limitation on the apparatus based on the apparatus—release transmitter 20a distance measured by the distance measurement unit 33 (step S310). Then, the process of FIG. 4 is terminated.

According to the control system configured as described above, the control of the electronic apparatus 30a is performed by the control transmitter 10a and the release transmitter 20a. Specifically, when a child wearing the control transmitter 10a comes close to the electronic apparatus 30a within a predetermined distance of the electronic apparatus 30a, the control transmitter 10a sets a limitation on the operation of the electronic apparatus 30a. As a result, for example, it is possible to prevent physical damage to a child that may occur when the child comes into contact with the electronic apparatus 30a or the like from occurring. Further, when an adult wearing the release transmitter 20a comes close to the electronic apparatus 30a within a predetermined distance of the electronic apparatus 30a, the limitation of the electronic apparatus 30a is released. Accordingly, when the adult wearing the release transmitter 20a is at a location close to the child, the limitation of the electronic apparatus 30a is released. As a result, when the adult wearing the release transmitter 20a is at a location far from the child, the limitation of the electronic apparatus 30a is not released. Further, it is not necessary to perform a bothersome work such as switching the setting for performing the control of the electronic apparatus 30a. Therefore, the control system of the invention can improve safety and convenience.

Further, the control transmitter 10a and the release transmitter 20a may be transmitters having the same configuration. In this case, the transmitter includes both a control mode and a release mode. The user (for example, adult) selects the mode of the transmitter when using the transmitter to any of the control mode and the release mode. For example, when a child uses the transmitter, the user (for example, adult) sets the mode of the transmitter to the control mode. Further, for example, when the adult uses the transmitter, the user sets the mode of the transmitter to the release mode. According to such a configuration, it is possible to use one transmitter for different applications.

The control transmitter 10a and the release transmitter 20a may have an arbitrary form as long as the form is capable of transmitting radio waves. For example, the control transmitter 10a and the release transmitter 20a may have a wearable form for a child and an adult, such as a badge, a patch, a pendant, an armband, a wristwatch, and a belt.

The above embodiment is described using an example in which the distance between the control transmitter 10a and the electronic apparatus 30a and the distance between the release transmitter 20a and the electronic apparatus 30a are measured based on the intensity of radio waves of the control transmitter 10a received by the electronic apparatus 30a and the intensity of radio waves of the release transmitter 20a received by the electronic apparatus 30a; however, the embodiment is not limited thereto. For example, the distance measurement unit 33 may include a known distance measurement device such as a laser radar, an ultrasonic sensor, and an infrared sensor, and the distance measurement device may measure the distance between the control transmitter 10a and the electronic apparatus 30a and the distance between the release transmitter 20a and the electronic apparatus 30a.

Second Embodiment

Figure 5:
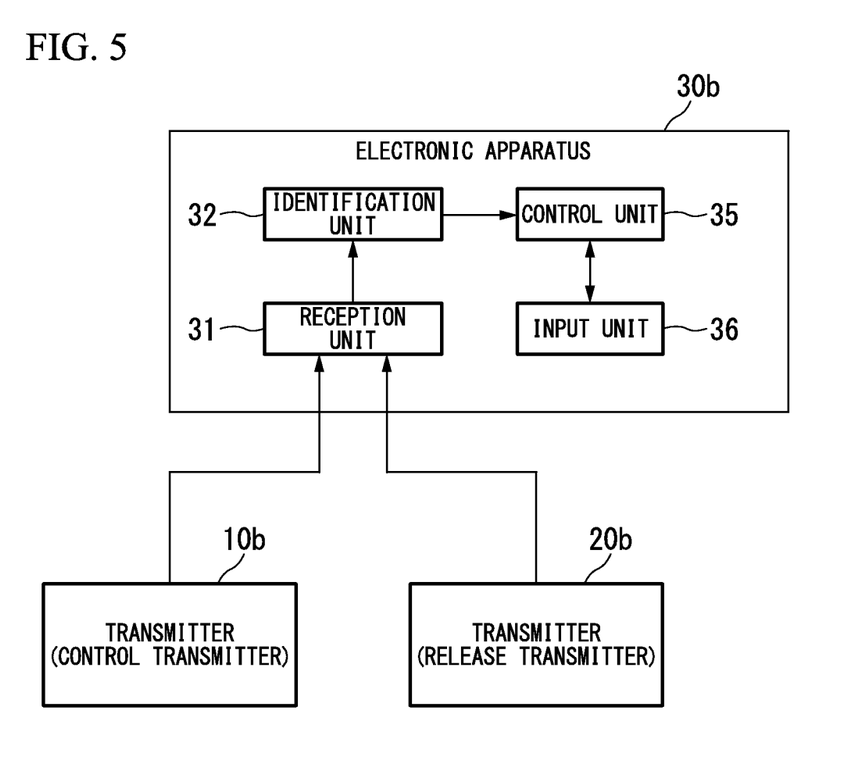
FIG. 5 is a block diagram showing a system configuration in a second embodiment of a control system.

FIG. 5 is a block diagram showing a system configuration in a second embodiment of a control system.

The control system of the second embodiment includes a control transmitter 10b, a release transmitter 20b, and an electronic apparatus 30b. A transmission distance of radio waves is set in advance in the control transmitter 10b and the release transmitter 20b in the second embodiment. The transmission distance of radio waves is, for example, 3 m, 5 m, and the like. In the following description, the transmission distance of radio waves of the control transmitter 10b and the transmission distance of radio waves of the release transmitter 20b are identical to each other.

Hereinafter, a functional configuration of the electronic apparatus 30b will be described. The electronic apparatus 30b includes a CPU, a memory, an auxiliary storage device, and the like connected to one another via a bus, and executes a control program. By executing the control program, the electronic apparatus 30b functions as a device including a reception unit 31, an identification unit 32, a control unit 35, and an input unit 36. All or part of the functions of the electronic apparatus 30b may be realized by using hardware such as an ASIC, a PLD, and a FPGA. Further, the control program may be recorded on a computer-readable recording medium. Examples of the "computer-readable recording medium" include portable media such as a flexible disk, a magneto-optical disc, a ROM, and a CD-ROM, and a storage device such as a hard disk incorporated in a computer system. Further, the control program may be transmitted or received via a telecommunication line.

The electronic apparatus 30b has a configuration different from that of the electronic apparatus 30a in that the electronic apparatus 30b does not include the distance measurement unit 33 and the determination unit 34. The electronic apparatus 30b has the same configuration as the electronic apparatus 30a with respect to other components.

Therefore, the components common to the electronic apparatus 30a are denoted by the same reference numerals as those for the electric apparatus 30a, and descriptions of the components are omitted.

Wireless communications between the control transmitter 10b and the electronic apparatus 30b and between the release transmitter 20b and the electronic apparatus 30b may be performed, for example, by a method such as Wi-Fi (registered trademark) or Bluetooth (registered trademark).

Figure 6:
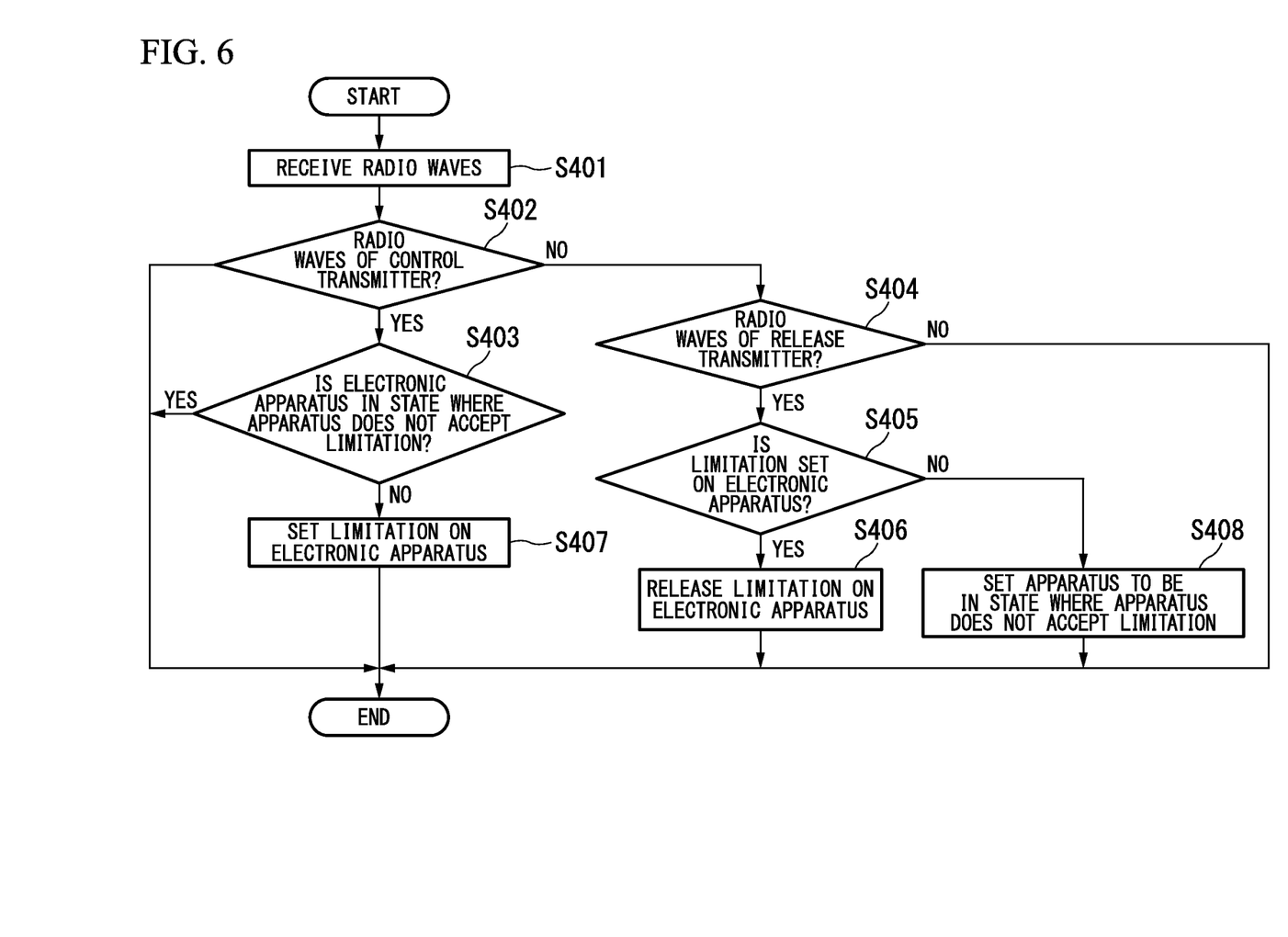
FIG. 6 is a flowchart showing a specific example of a flow of a control process of an electronic apparatus in the second embodiment.

FIG. 6 is a flowchart showing a specific example of a flow of a control process of the electronic apparatus 30b in the second embodiment.

The reception unit 31 of the electronic apparatus 30b receives radio waves transmitted from the control transmitter 10b or the release transmitter 20b (step S401). The identification unit 32 identifies whether or not the received radio waves are the radio waves of the control transmitter 10b (step S402). Specifically, the identification unit 32 refers to identification information included in the received radio waves and identifies whether or not the received radio waves are the radio waves of the control transmitter 10b.

When the identification unit 32 determines that the received radio waves are the radio waves of the control transmitter 10b (step S402—YES), the determination unit 34 determines whether or not the apparatus is in a state where the apparatus does not accept a limitation (step S403). When the apparatus is in a state in which the apparatus does not accept a limitation (step S403—YES), the control unit 35 does not limit the operation of the apparatus. Then, the process of FIG. 6 is terminated.

In the process of step S402, when the identification unit 32 determines that the received radio waves are not the radio waves of the control transmitter 10b (step S402—NO), the identification unit 32 identifies whether or not the received radio waves are the radio waves of the release transmitter 20b (step S404). When the identification unit 32 determines that the received radio waves are the radio waves of the release transmitter 20b (step S404—YES), the determination unit 34 determines whether or not a limitation is set on the apparatus (step S405). When the determination unit 34 determines that a limitation is set on the apparatus (step S405—YES), the control unit 35 releases the limitation on the apparatus (step S406). Specifically, the control unit 35 sets the apparatus back to a state before the limitation is set on the apparatus and thereby releases the limitation. Then, the process of FIG. 6 is terminated.

In the process of step S403, when the apparatus is not in a state in which the apparatus does not accept a limitation (step S403—NO), the control unit 35 sets a limitation on the apparatus (electronic apparatus 30b) (step S407). Specifically, the control unit 35 controls the operation of the apparatus to the degree that the apparatus does not harm a child. Then, the process of FIG. 6 is terminated.

In the process of step S404, when the identification unit 32 determines that the received radio waves are not the radio waves of the release transmitter 20b (step S404—NO), the electronic apparatus 30b terminates the process.

In the process of step S405, when the determination unit 34 determines that a limitation is not set on the apparatus (step S405—NO), the control unit 35 sets the apparatus to be in a state where the apparatus does not accept a limitation (step S408). Specifically, in the process of step S408 and the subsequent processes, while the release transmitter 20b is present within a predetermined distance, even when the control transmitter 10b is present within a predetermined distance, the control unit 35 does not limit the operation of the apparatus. Then, the electronic apparatus 30b terminates the process.

According to the control system configured as described above, the control of the electronic apparatus 30b is performed by the control transmitter 10b and the release transmitter 20b. Specifically, when the electronic apparatus 30b receives radio waves from the control transmitter 10b worn by a child, the electronic apparatus 30b limits the operation of the apparatus. As a result, for example, it is possible to prevent physical damage to a child that may occur when the child comes into contact with the electronic apparatus 30b or the like from occurring. When the electronic apparatus 30b receives radio waves from the release transmitter 20b worn by an adult, the electronic apparatus 30b releases the limitation of the apparatus. In this case, the adult wearing the release transmitter 20b is present close to the electronic apparatus 30b. Accordingly, since the child and the adult are located close to each other, the adult can watch the child. In addition, it is not necessary to perform a bothersome work such as switching the setting for performing the control of the electronic apparatus 30b.

Therefore, the control system of the invention can have safety and improve convenience.

Further, the control transmitter 10b and the release transmitter 20b may be transmitters having the same configuration. In this case, the transmitter includes both a control mode and a release mode. The user (for example, adult) selects the mode of the transmitter when using the transmitter to any of the control mode and the release mode. For example, when a child uses the transmitter, the user (for example, adult) sets the mode of the transmitter to the control mode. Further, for example, when the adult uses the transmitter, the user sets the mode of the transmitter to the release mode. According to such a configuration, it is possible to use one transmitter for different applications.

The control transmitter 10b and the release transmitter 20b may have an arbitrary form as long as the form is capable of transmitting radio waves. For example, the control transmitter 10b and the release transmitter 20b may have a wearable form for a child and an adult, such as a badge, a patch, a pendant, an armband, a wristwatch, and a belt.

Further, it is not necessary to limit the transmission distances of radio waves of the control transmitter 10b and the release transmitter 20b to the above-described configuration. For example, a configuration may be used in which the transmission distances of radio waves of the control transmitter 10b and the release transmitter 20b are different from each other. Specifically, the transmission distance of the radio waves of the control transmitter 10b can be long (for example, 5 m), and the transmission distance of the radio waves of the release transmitter 20b can be short (for example, 3 m). By such a configuration, when an adult wearing the release transmitter 20b is present at a location closer to the electronic apparatus 30b than a child wearing the control transmitter 10b, the limitation of the electronic apparatus 30b is released. Accordingly, even when the limitation of the electronic apparatus 30b is released, the adult is closer to the electronic apparatus 30b than the child. Therefore, the adult pays attention to the child, and thereby it is possible to improve safeness for the child.

While the embodiments of the present invention have been described above in detail with reference to the drawings, specific configurations are not limited to the embodiments, and include designs or the like without departing from the scope of the invention.

The invention claimed is:

1. A control system comprising:
a first transmitter wearable by a first user;
a second transmitter wearable by a second user; and
a reception device comprising:
  a receiver configured to receive a wireless signal from the first transmitter being worn by the first user and a wireless signal from the second transmitter being worn by the second user, and
  at least one processor configured to cause the reception device to:
    measure a distance between the reception device and the first transmitter in accordance with intensity of the wireless signal from the first transmitter received by the receiver,
    measure a distance between the reception device and the second transmitter in accordance with intensity of the wireless signal from the second transmitter received by the receiver,
    set a limitation on operation of the reception device when both
      the measured distance between the reception device and the first transmitter is within a predetermined distance, and
      the measured distance between the reception device and the second transmitter is not within the predetermined distance, and,
    when the wireless signal from the first transmitter is no longer received by the receiver for a predetermined period of time while the limitation on operation of the reception device is set, release the limitation on operation of the reception device,
    wherein the reception device is an electric fan and the limitation on operation is a reduction in rotation speed of the electric fan, or the reception device is a heating appliance and the limitation on operation is a reduction in temperature of the heating appliance or a stopping of operation of the heating appliance.

2. The control system according to claim 1, wherein the at least one processor is further configured to cause the reception device to:
when the measured distance between the reception device and the second transmitter becomes within the predetermined distance while the limitation on operation of the reception device is set, release the limitation on operation of the reception device.

3. The control system according to claim 1, wherein the at least one processor is further configured to cause the reception device to:
release the limitation on operation of the reception device, when the measured distance between the reception device and the second transmitter becomes within the predetermined distance, and
prevent the limitation on operation of the reception device from being set while the measured distance between the reception device and the second transmitter is within the predetermined distance.

4. A reception device comprising:
a receiver configured to receive a wireless signal from a first transmitter being worn by a first user and a wireless signal from a second transmitter being worn by a second user; and
at least one processor configured to cause the reception device to:
  measure a distance between the reception device and the first transmitter in accordance with intensity of the wireless signal from the first transmitter received by the receiver,
  measure a distance between the reception device and the second transmitter in accordance with intensity of the wireless signal from the second transmitter received by the receiver,
  set a limitation on operation of the reception device when both
    the measured distance between the reception device and the first transmitter is within a predetermined distance, and
    the measured distance between the reception device and the second transmitter is not within the predetermined distance, and
  when the wireless signal from the first transmitter is no longer received by the receiver for a predetermined period of time while the limitation on operation of the reception device is set, release the limitation on operation of the reception device,
  wherein the reception device is an electric fan and the limitation on operation is a reduction in rotation speed of the electric fan, or the reception device is a heating appliance and the limitation on operation is a reduction in temperature of the heating appliance or a stopping of operation of the heating appliance.

5. The reception device according to claim 4, wherein the at least one processor is further configured to cause the reception device to:
when the measured distance between the reception device and the second transmitter becomes within the predetermined distance while the limitation on operation of the reception device is set, release the limitation on operation of the reception device.

6. The reception device according to claim 4, wherein the at least one processor is further configured to cause the reception device to:
release the limitation on operation of the reception device, when the measured distance between the reception device and the second transmitter becomes within the predetermined distance, and
prevent the limitation on operation of the reception device from being set while the measured distance between the reception device and the second transmitter is within the predetermined distance.

7. A reception device comprising:
a receiver configured to receive a wireless signal from a first transmitter being worn by a first user and a wireless signal from a second transmitter being worn by a second user;
means for measuring a distance between the reception device and the first transmitter in accordance with intensity of the wireless signal from the first transmitter received by the receiver, and for measuring a distance between the reception device and the second transmitter in accordance with intensity of the wireless signal from the second transmitter received by the receiver;

means for setting a limitation on operation of the reception device when both
- the measured distance between the reception device and the first transmitter is within a predetermined distance, and
- the measured distance between the reception device and the second transmitter is not within the predetermined distance; and means for, when the wireless signal from the first transmitter is no longer received by the receiver for a predetermined period of time while the limitation on operation of the reception device is set, releasing the limitation on operation of the reception device, wherein the reception device is an electric fan and the limitation on operation is a reduction in rotation speed of the electric fan, or the reception device is a heating appliance and the limitation on operation is a reduction in temperature of the heating appliance or a stopping of operation of the heating appliance.

\* \* \* \* \*